United States Patent

Rolle

[11] Patent Number: 5,891,387
[45] Date of Patent: Apr. 6, 1999

[54] METHOD FOR PRODUCING A PACKAGING ITEM

[75] Inventor: Jean-Claude Rolle, Bulle, Switzerland

[73] Assignee: Convenience Food Systems B.V., En Bakel, Netherlands

[21] Appl. No.: 981,697
[22] PCT Filed: Jul. 4, 1996
[86] PCT No.: PCT/IB96/00646
§ 371 Date: Feb. 12, 1998
§ 102(e) Date: Feb. 12, 1998
[87] PCT Pub. No.: WO97/02998
PCT Pub. Date: Jan. 30, 1997

[30] Foreign Application Priority Data

Jul. 7, 1995 [CH] Switzerland .............. 01 985/95

[51] Int. Cl.⁶ ..................................................... B29C 51/10
[52] U.S. Cl. ..................... 264/554; 264/101; 264/318; 264/321; 264/553
[58] Field of Search ............................ 264/553, 554, 264/571, 321, 318, 101

[56] References Cited

U.S. PATENT DOCUMENTS

| 3,209,978 | 10/1965 | Dupuis . | |
|---|---|---|---|
| 3,238,031 | 3/1966 | Nikull | 264/553 |
| 3,787,546 | 1/1974 | Pratt et al. | 264/553 |
| 3,846,526 | 11/1974 | Wade | 264/571 |
| 3,974,722 | 8/1976 | Florian . | |
| 4,312,829 | 1/1982 | Fourcher | 264/571 |
| 4,944,901 | 7/1990 | Kwok | 264/554 |

FOREIGN PATENT DOCUMENTS

| 2.196.889 | 3/1974 | France . | |
|---|---|---|---|
| 2 717 452-A1 | 9/1995 | France . | |
| 62-263021 | 11/1987 | Japan | 264/571 |
| WO 81/01825 | 7/1981 | WIPO . | |
| WO 83/01595 | 5/1983 | WIPO | 264/571 |
| WO 94/00366 | 1/1994 | WIPO . | |

Primary Examiner—Allan R. Kuhns
Attorney, Agent, or Firm—Panitch Schwarze Jacobs & Nadel, P.C.

[57] ABSTRACT

The inventive packaging item is e.g. a tray for packing fresh meat. It has at least on its bottom part (10) grooves (11) which open towards the inside of the packaging item. The openings of these grooves are narrower than the inside part of the grooves. If the groove opening is sufficiently narrow e.g 1mm or less, unwanted liquid oozing out of the packed meat is trapped in these grooves (11) and such separated from the meat and kept out of sight of a potential buyer.

7 Claims, 4 Drawing Sheets

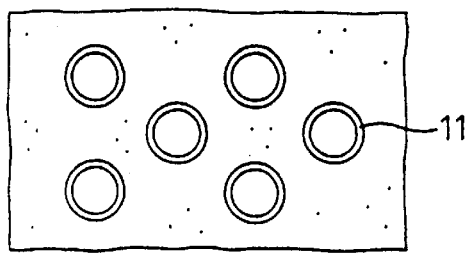
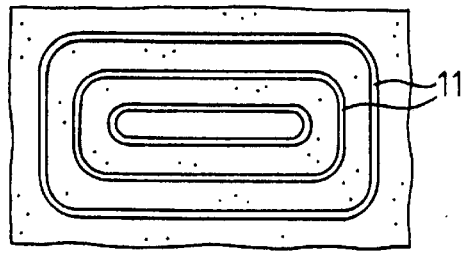
FIG. 5                    FIG. 6
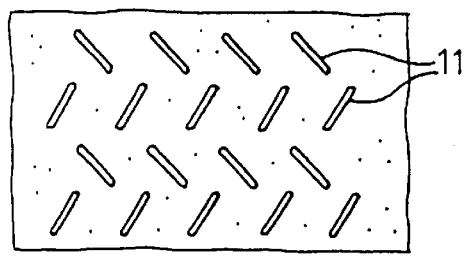
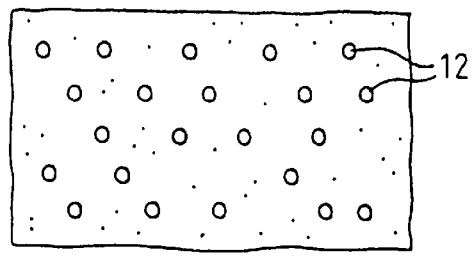
FIG. 7                    FIG. 8
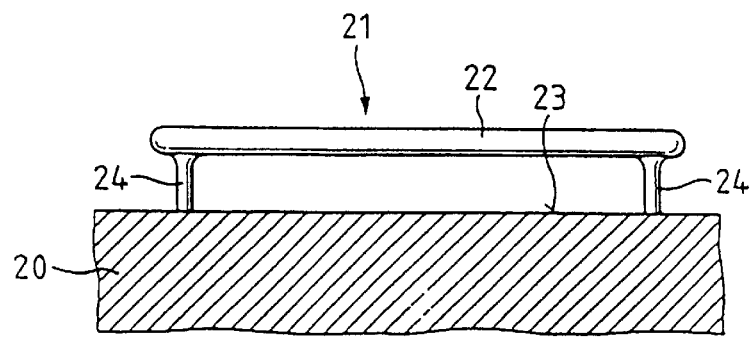
FIG. 9

METHOD FOR PRODUCING A PACKAGING ITEM

BACKGROUND OF THE INVENTION

The invention is in the field of the packing industry and relates to a method of producing packaging items according to the generic part of the first independent claim. The packing item made according to the method is applicable in particular for packing goods from which liquid tends to ooze, which liquid for different reasons is not wanted inside the package.

An example for such a liquid is the meat juice oozing out of packed fresh meat. If the meat is packed in a liquid proof packaging item and remains so for some time, the meat juice accumulates inside the package round the meat. This does not look nice and furthermore it constitutes a medium in which deterioration of the meat is accelerated. Therefore it is important to keep this meat juice not only out of sight of a potential buyer but it is also important to keep it, as far as possible, separated from the meat. Similar problems arise with any goods to be packed which goods produce a liquid whilst packed.

According to the state of the art the problem of unwanted liquid inside a liquid proof package is solved, in the case of packages made from polymers which do not absorb any liquid at all, by introducing an absorbing agent into the package, which absorbing agent absorbs the unwanted liquid. The absorbing agent mainly used in the case of packaged meat is a piece of absorbing paper. This piece of absorbing paper is usually positioned between the not transparent bottom part of the packaging item and the meat and it is smaller than the meat. Thus, the absorbing paper cannot be seen as long as the package is closed. Furthermore the piece of absorbing paper reduces the meat surface which is in direct contact with the absorbed juice, i.e. the absorbing paper solves the problem of the unwanted liquid in a satisfactory way.

However, the absorbing paper or any absorbing agent introduced in the package keeps the liquid meat juice out of sight of the customer only as long as he does not open the package. Then, this customer is confronted with the wet and not very appetizing absorbing paper which he has to separate from the meat and which he has to dispose of. Furthermore the absorbing paper or any other sort of absorbing agent constitutes a further piece of material adding to the weight and to the cost of the package.

A further known means for removing unwanted liquid in a packaging item from the view of a potential buyer and from the packed goods are grooves or holes in the bottom part of the packaging item which grooves or holes act as capillaries taking up the liquid and not releasing it any more. Such packaging items and methods for producing them are described in the publications U.S. Pat. No. 3,974,722 and FR-2717452.

SUMMARY OF THE INVENTION

It is the object of the invention to create a further method for producing a packaging item applicable in particular for packing goods out of which unwanted liquid oozes, which packaging item differs from known such items in that, without introduction of a separate absorbing agent, the unwanted liquid is kept substantially separated from the packed good and is prevented from causing an esthetic drawback. The inventive packaging item is to be substantially producible with the same production processes from the same amount of the same sort of material or materials as are packaging items already known and applicable for the same packing purposes. These objects are achieved by the packaging item and the method for producing it as they are defined in the claims.

The inventive packaging item which is e.g. a tray to be closed with a lidding film, has in at least the one part of its wall which is to constitute the bottom of the package, grooves which are, over their whole length, open towards the inside of the packaging item, whereby the opening of the grooves is narrower than the inside of the grooves. These grooves may have any length. They may also be so short, that their length is about equal to their width such that they are not grooves in the proper sense of the word any more but holes, e.g with a round opening.

In these grooves the unwanted liquid is trapped, if the width of the groove opening is chosen such that the liquid is driven into the opening by a capillary effect and kept inside the groove by the same effect. The maximum width possible for the groove openings is dependent on the surface tension between the package material and the liquid concerned. It is best determined by corresponding experiments.

The inventive packaging item is made from a thermoplastic polymer material and is produced by a thermoforming process which includes a vacuum expansion step for expanding a foamed layer in the material of which the packaging item is fabricated. For forming at least its bottom a forming tool (thermoformning die or mould for injection moulding) with protrusions according to the desired grooves is used. These protrusions are so formed that the material is formed or molded around them to form between the protrusion and the main surface of the tool, lips on both sides of groove openings which openings are narrower than the inside of the groove. After thermoformning or moulding, the tool is separated from the formed item whereby the protrusions are pulled out of the grooves. For this operation, in particular when working with a material which is not easily elastically deformable when cold, the temperature management is such that the protrusions can be removed from the grooves without damaging nor irreversibly deforming the lips, such that these lips return to their original form, at least as far as it is defined by the main surface of the tool whereby the groove openings may be widened to a limited degree by the removing of the protrusions from the grooves.

BRIEF DESCRIPTION OF THE DRAWINGS

Examples of the inventive packaging item and of the inventive method for producing the packaging items as well as tools for this method are described in detail in connection with the following Figures, wherein

FIGS. 3 to 8 show exemplified layouts of grooves in bottoms of inventive packaging items;

FIGS. 9 to 11 show tools for producing the inventive packaging item and

DETAILED DESCRIPTION OF THE DRAWINGS

Figure 1:
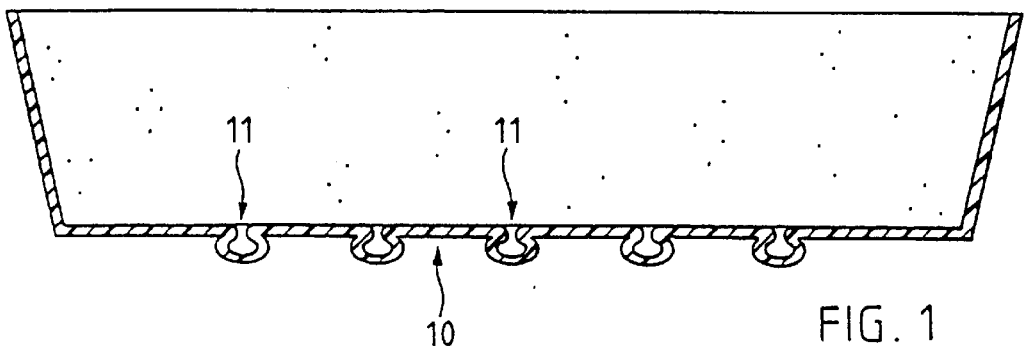
FIGS. 1 and 2 show sections through two exemplified embodiments of the inventive packaging item.
Figure 2:
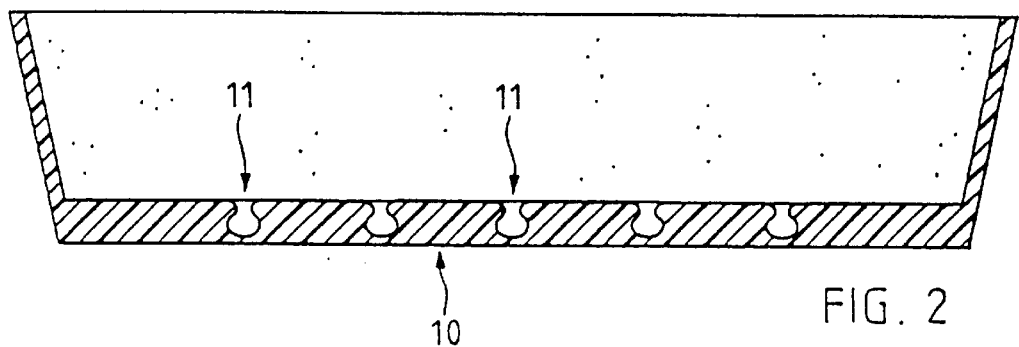

FIGS. 1 and 2 show cross sections of two exemplified embodiments of the inventive packaging item (section perpendicular to the grooves). They are both trays and their bottom part 10 shows grooves 11 with openings on the inner surface of the packaging item, i.e. grooves open towards the inside of the package. The opening of the grooves is less wide than the inner part of them. As already mentioned, the grooves may be of varying length or they may be very short and such form holes rather than grooves.

The inventive packaging item is made of a thermoplastic polymer material such as e.g. polypropylene, polyethylene (high density, low density or linear low density polyethylene), polyester, polycarbonate, polyethylene naphthalate or polystyrene. The material may consist of one layer only or may be a composite material of several layers, wherein one or more of the layers may consist of a foamed material.

Packaging items made of the above mentioned materials with grooves with an opening width of 1 mm or less serve well for trapping watery liquids not containing specially surface active ingredients. Such a liquid is e.g. meat juice. The maximal possible width of the recess openings for other pairings of packaging material and liquid with greatly different surface characteristics than water (in particular surface tension and wettability) have to be determined by corresponding experiments.

The grooves of the inventive packaging item may protrude on the outside of it, whereby the bottom of the packaging item (or any other part which shows grooves also) has a more or less constant thickness and groove-formed deformations. A packaging item with such grooves is shown in FIG. 1. Additionally to their function as trap for unwanted liquid, such grooves may also serve for stiffening and reinforcing the packaging item, if they have a sufficient length.

The grooves may also be made such that they do not show on the outside surface of the packaging item. The bottom or wall of the item then has in the areas of the grooves a reduced thickness. Such a packaging item with grooves is shown in FIG. 2. Forms of grooves in between the grooves shown in FIGS. 1 and 2 are thinkable also.

Figure 3:
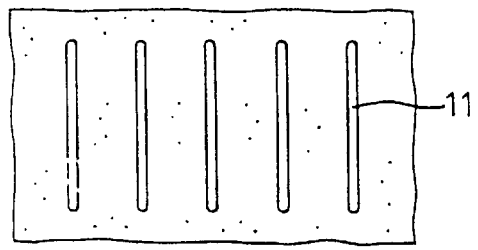
Figure 4:
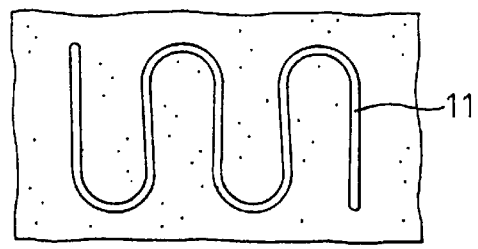

FIGS. 3 to 8 show exemplified bottoms of inventive packaging items, viewed from the inside of the packaging item. All these bottoms show different arrangements of grooves 11 or 12 of which only the openings are visible. FIG. 3 shows a plurality of parallel grooves, FIG. 4 one single groove with a snake form. FIG. 5 shows a plurality of grooves each closed in itself, FIG. 6 a plurality of closed grooves running parallel to each other. FIG. 7 shows a random arrangement of short grooves with different orientation and FIG. 8 a random pattern of very short grooves or rather holes 12.

It is obvious that from combining and altering the groove patterns according to FIGS. 3 to 8, a multitude of further patterns results. It is also obvious that the bottom of the packaging item in which the grooves are positioned does not have to be oblong as shown in the FIGS. 3 to 8, it can e.g. be round square, triangular a.s.o.

Only grooves in the bottom part of a packaging item can serve as a trap for unwanted liquid, but of course other parts of the packaging item may carry grooves also, may this be for decorative reasons or for reasons dictated by the manufacturing process.

Figure 10:
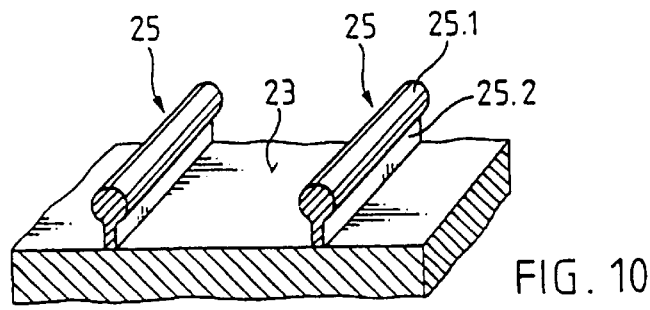
Figure 11:
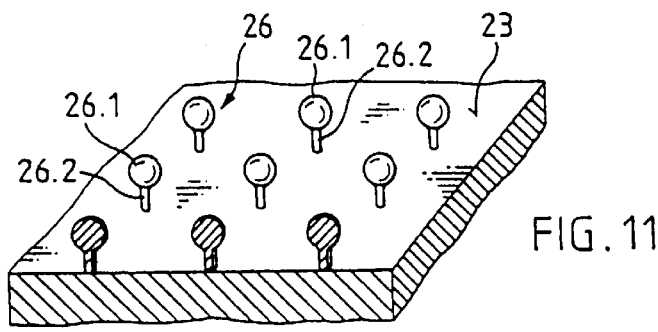

FIGS. 9 to 11 show different tools for forming the grooves of the inventive packaging item.

FIG. 9 shows a tool applicable for a thermoformning process. The tool 20 is shown in section whereby the section is parallel to a straight, oblong protrusion 21 for forming a straight groove (as e.g. shown in FIG. 3). The protrusion consists of a bar 22 with e.g. a round cross section which bar 22 is positioned within a distance of the main surface 23 of the tool and parallel to this surface by means of at least two fittings 24 which preferably are thinner than the bar 22. As will be shown further on, such a tool is in particular applicable in a thermoforming process.

FIG. 10 shows a tool cut perpendicular to two straight, oblong protrusions 25 which run parallel to each other. The protrusions 25 consist of a wider, barlike headpiece 25.1 and a narrower neckpiece 25.2 which neckpiece runs along the whole length of the protrusion 25 and is fixed to the main surface 23 of the tool.

FIG. 11 shows a tool for producing a packaging item as illustrated in FIG. 8. The protrusions 26 of this tool are not oblong as the protrusions of the tools according to FIGS. 9 and 10 but extend to about the same amount in all directions parallel to the main surface 23 of the tool. The protrusions consist of a headpiece 26.1 which is e.g. spherical and of a neckpiece 26.2, which is e.g. cylindrical.

As will be shown furtheron, the tools according to FIGS. 9, 10 and 11 may be used together with a counter tool having an even counter surface or together with a counter tool having grooves positioned according to the position of the protrusions.

Figure 12:
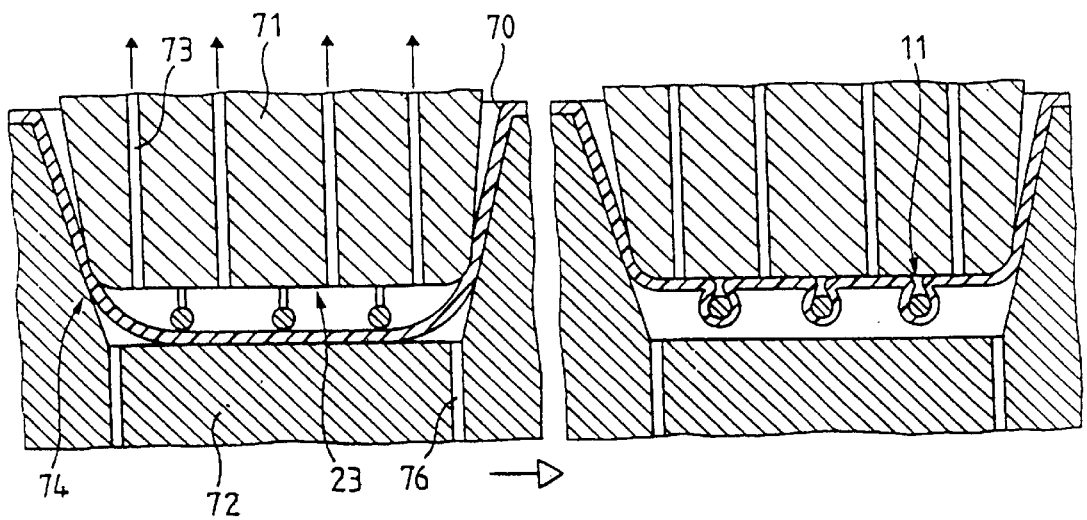
FIGS. 12 to 14 show arrangements for producing the inventive packaging item in a thermoforming process (FIG. 12), in a thermoforming process combined with vacuum expansion (FIG. 13) and in an injection moulding process.

FIG. 12 shows the production of an inventive packaging item, e.g. a tray with a grooved bottom. The item is produced from a sheet of packaging material 70 by thermoforming this sheet between two tools 71 and 72 of which the male tool 71 forming the inside of the item is made according to the same principle as the tool shown in FIG. 9, i.e. with protrusions arranged with a distance from the main surface of the tool. The left hand side of FIG. 12 shows the thermoforming step, in which the tray is formed between the two tools or between the protrusions of the one tool and the other tool respectively. In this phase of the production of the inventive packaging item, vacuum is applied through corresponding channels 73 in the male tool 71 between the tool surface 23 carrying the protrusions and. the thermoformed sheet material 70.

Through the effect of the vacuum the sheet 70 being pulled against the main surface 23 of the tool 71 is deformed around the protrusions whereby grooves 11 in the form shown in FIG. 1 are produced. This phase of the production process is illustrated on the right hand side of FIG. 12.

In order to achieve a sufficient vacuum for deforming the sheet material 70, there must be provided more or less tight areas between the sheet material and the male tool 71. These are e.g. the areas 74. Furthermore provision has to be made for pressure compensation or even an elevated pressure on the side of the sheet opposite to the protrusions, e.g. by providing airing channels 76 or similar channels connected to a source of elevated pressure or by making the female tool from a porous material.

In the process according to FIG. 12 tools according to FIGS. 10 or 11 (instead of a tool according to FIG. 9) are also applicable. The counter tool illustrated in FIG. 12 has an even counter surface facing the protrusions. If a counter tool with a grooved counter surface is used, the grooves in the bottom of the packaging item are preformed already in the first thermoforming step (thermoforming through the tools) such that the deformation to be achieved in the second thermoforming step (thermoforming achieved by a pressure difference between the two surfaces of the packaging material) is considerably smaller.

For separating the thermoformed item from the tools, e.g. vacuum is applied between the counter tool (female tool) and the packaging item, then the male tool is removed from the item whereby the protrusions are pulled out of the grooves and then the packaging item is ejected by pressurized air or by an ejection tool incorporated in the female tool. If the finished item is still part of a sheet of packaging material, it might be possible to remove it from the male tool and the female tool without the help of a pressure difference and/or an ejection tool.

Figure 13:
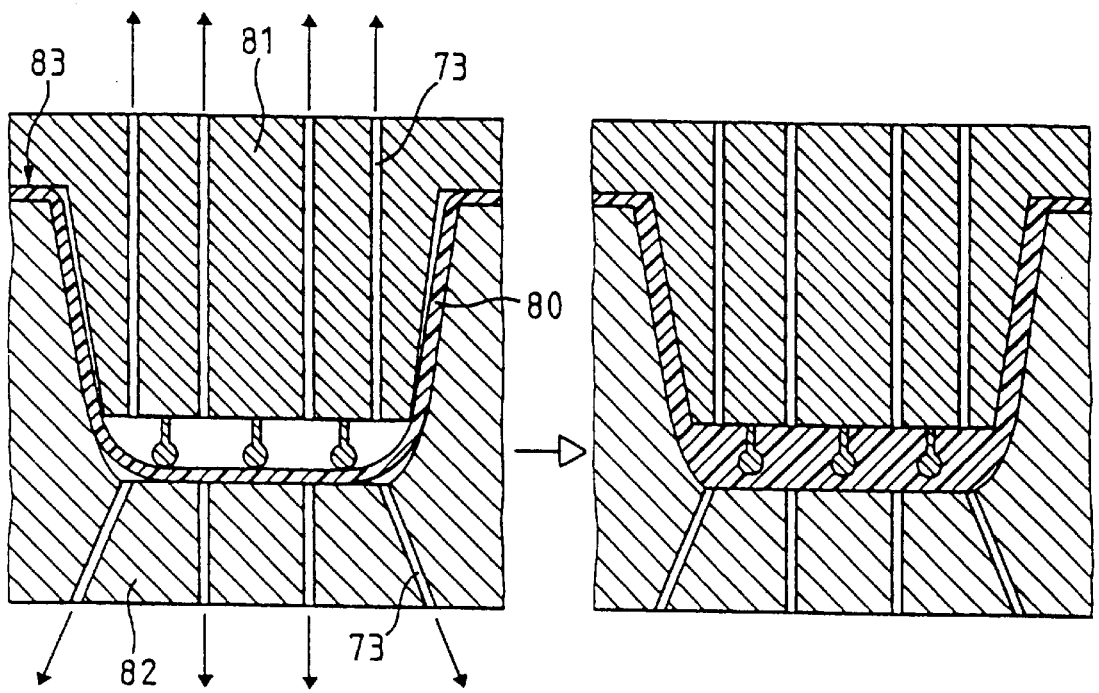

FIG. 13 shows a process for manufacturing inventive packaging items, e.g. trays, with a thermoforming process combined with vacuum expansion. This process starts with a sheet material which contains at least one layer of a foamed thermoplastic material. It can be shown, that by applying vacuum to at least one side of such a material, the foam layer or foam layers can be made to expand such that the thickness of the sheet increases in the treated area. To achieve this, the foamed material needs to have a temperature which is high enough for the material to be plastically deformable, when the vacuum is applied.

The inventive packaging item is again made by thermoforming a sheet 80 of packaging material, which packaging material contains at least one foam layer. The sheet is thermoformed between two tools 81 and 82, wherein the male tool 81 again carries protrusions according to one of FIGS. 9 to 11 and the female tool may again have an even counter surface facing the protrusions (as illustrated) or may have a grooved counter surface. Both tools 81 and 82 have channels 73 which are connected to some sort of underpressure source and the tools 81 and 82 together with the sheet 80 close at least the area of the bottom of the item to be made, e.g. by a tight fit in the area 83. The arrangement just after the thermoforming step is shown on the left hand side of FIG. 13.

In this phase the cavity between the two tools is evacuated from both sides of the sheet 80, which causes the foam layer to expand and the sheet to fill the cavity, in particular to expand around the protrusions to form the grooves. This phase is illustrated on the right hand side of FIG. 13.

Removing the finished packaging item is carried out in the same way as described for the method according to FIG. 12.

According to the packaging material and to the process parameters applied, it is possible to achieve products which lie in between the products shown on the right hand side of FIGS. 12 and 13. In other words this means: when thermoformning a sheet material with at least one foamed layer and with vacuum application on one side or on both sides of the material, some expansion of the foamed layer is expected. The amount of the expansion is dependent e.g. on the difference between the pressures on both side of the material, on the thermostability of surface layers on either side of the material and on the temperature difference between the two surfaces of the material.

Figure 14:
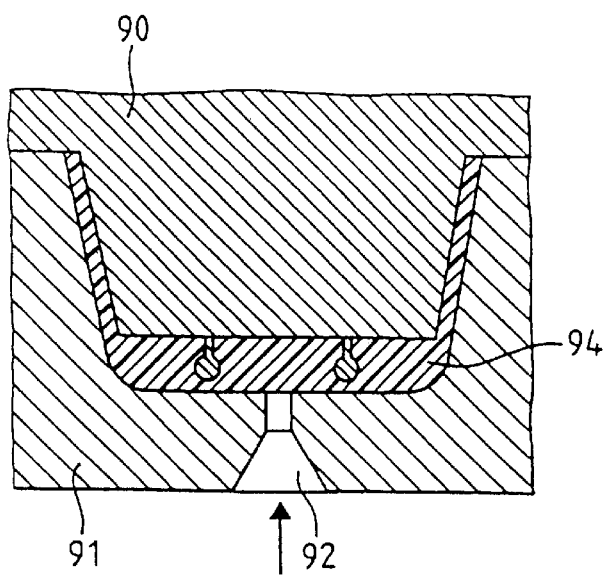

FIG. 14 shows a mould for injection moulding an inventive packaging item, e.g. a tray. The mould consists of two mould parts 90 and 91, which together form a moulding cavity. One of the mould parts 90 carries protrusions according to FIG. 10 or 11. Through an injection nozzle 92 the cavity between the two mould parts is filled with a thermoplastic material 94 which may be foamed also. When the mould parts 90 and 91 are separated from each other to release the moulded item, the protrusions are pulled out of the material leaving grooves or holes with openings which are narrower than the inside parts. For such a process also, the temperature management has to be designed such that the removal of the protrusions from the grooves does deform the lips closing the grooves only temporarily or only to such a degree that the main surface of the packaging item stays sufficiently flat and the openings of the grooves do not become too wide.

I claim:

1. Method for producing a packaging item made by thermoforming monolayer or multi layer thermoplastic sheet whereby the packaging item for trapping liquid unwanted on an inside of the item comprises at least on its bottom part (10) at least one of a groove (11) and a hole (12) open towards the inside of the packaging item, the at least one of the groove and the hole having an opening on an inside surface of the packaging item narrower than an inner part which extends away from the inner surface, comprising:

providing the sheet (80) which has at least one foam layer;

providing a tool (81) having protrusions (21,25, 26) protruding from a main surface (23) of the tool and substantially corresponding to the at least one of the groove and the hole to be formed;

providing a countertool (82) with an inside surface;

forming a cavity between the tool (81) and the countertool (82);

evacuating the cavity from the inside surfaces of the tool and the counter tool;

vacuum expanding the foam layer of the sheet (80) to form lips around the protrusions (21, 25, 26); and removing the sheet from the protrusions (21, 25 and 26) by elastically deforming the lips.

2. Method according to claim 1, characterized in that the protrusions (21, 25, 26) are arranged at a distance from the main tool surface (23) or have a neckpiece (25.2, 26.2) and a headpiece (25.1, 26.1) wherein the headpiece (25.1, 26.1) is wider than the neckpiece (25.2, 26.2).

3. Method according to claim 1, characterized in that for preventing unwanted irreversible deformation of the lips the protrusions are removed from the grooves when the packaging material is still at an elevated temperature.

4. Method according to claim 1, characterized in that the protrusions are removed from the grooves while a vacuum is applied between the counter tool and the packaging item.

5. Method according to claim 1, characterized, in that the protrusions are such dimensioned that the opening of the at least one groove (11) and/or hole (12) has a width of 1 mm or of less than 1 mm.

6. Method according to claims 1, characterized, in that the protrusions are such dimensioned that the at least one groove (11) and/or hole (12) forms a regular pattern over the bottom part (10) of the packaging item.

7. Method according to claims 1, characterized, in that the foam layer of the thermoformed sheet consists of low density polyethylene, high density polyethylene, linear low density polyethylene, polypropylene, polyester, polycarbonate, polyethylene naphthalate or polystyrene.

* * * * *